US010656035B2

(12) United States Patent
Golly et al.

(10) Patent No.: US 10,656,035 B2
(45) Date of Patent: May 19, 2020

(54) PIEZORESISTIVE SENSOR WITH SPRING FLEXURES FOR STRESS ISOLATION

(71) Applicant: Rosemount Aerospace Inc., Burnsville, MN (US)

(72) Inventors: Timothy Thomas Golly, Lakeville, MN (US); David P. Potasek, Lakeville, MN (US); Cuong Tho Huynh, Eagan, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 0 days.

(21) Appl. No.: 16/599,470

(22) Filed: Oct. 11, 2019

(65) Prior Publication Data

US 2020/0041371 A1 Feb. 6, 2020

Related U.S. Application Data

(63) Continuation of application No. 15/416,801, filed on Jan. 26, 2017, now Pat. No. 10,481,025.

(51) Int. Cl.
*G01L 9/00* (2006.01)
*G01L 19/14* (2006.01)

(52) U.S. Cl.
CPC .......... *G01L 9/0048* (2013.01); *G01L 9/0042* (2013.01); *G01L 9/0052* (2013.01); *G01L 9/0055* (2013.01); *G01L 19/146* (2013.01); *G01L 19/147* (2013.01); *G01L 9/008* (2013.01); *G01L 9/0054* (2013.01)

(58) Field of Classification Search
CPC ..... G01L 9/0048; G01L 9/0055; G01L 9/146; G01L 9/0041; G01L 9/0042; G01L 9/008; G01L 9/0051; G01L 9/0052; G01L 9/0054; G01L 9/0073; G01L 2009/0066; G01L 2009/0069; G01L 19/0145; G01L 19/147

See application file for complete search history.

(56) References Cited

U.S. PATENT DOCUMENTS

| 4,800,758 A | 1/1989 | Knecht et al. |
| 6,351,996 B1 | 3/2002 | Nasiri et al. |
| 8,436,433 B1 | 5/2013 | Isebrand et al. |
| 8,803,262 B2 | 8/2014 | Childress et al. |
| 8,878,313 B2 | 11/2014 | Salmaso |
| 8,896,184 B2 | 11/2014 | Grosh et al. |
| 8,984,950 B2 | 3/2015 | Potasek |
| 9,010,190 B2 | 4/2015 | Potasek et al. |

(Continued)

FOREIGN PATENT DOCUMENTS

| DE | 102015116353 A1 | 4/2016 |
| WO | WO2007024911 A2 | 3/2007 |

OTHER PUBLICATIONS

Partial European Search Report for EP Application No. 18152565.0, dated Jun. 27, 2018, pp. 11.

(Continued)

*Primary Examiner* — Paul M. West
(74) *Attorney, Agent, or Firm* — Kinney & Lange, P.A.

(57) ABSTRACT

A MEMS device includes a backing wafer with a support portion and central back plate connected to the support portion with spring flexures, a diaphragm wafer with a support portions and a sensing portion connected to the support portion with spring flexures, a passivation layer on the diaphragm, and a topping wafer. The device allows for stress isolation of a diaphragm in a piezoresistive device without a large MEMS die.

8 Claims, 6 Drawing Sheets

(56) References Cited

U.S. PATENT DOCUMENTS

| 9,670,057 B1 | 6/2017 | Oldsen |
| 2001/0001550 A1 | 5/2001 | Bryzek et al. |
| 2015/0247773 A1 | 9/2015 | Wagner et al. |

OTHER PUBLICATIONS

Extended European Search Report for EP Application No. 18152565.0, dated Nov. 23, 2018, pp. 11.

PIEZORESISTIVE SENSOR WITH SPRING FLEXURES FOR STRESS ISOLATION

CROSS-REFERENCE TO RELATED APPLICATION(S)

This application is a continuation of U.S. application Ser. No. 15/416,801 filed Jan. 26, 2017 for "PIEZORESISTIVE SENSOR WITH SPRING FLEXURES FOR STRESS ISOLATION" by T. T. Golly, D. P. Potasek and Jan. 26, 2017.

BACKGROUND

Microelectromechanical systems (MEMS) are small devices made of electrical and mechanical components, designed to work together to sense physical properties in their local environment. For instance, MEMS pressure sensors are designed to sense and report the pressure of a fluid or environment in which the pressure sensor resides.

MEMS pressure sensors may be piezoresistive devices, which make use of changes in the resistivity of a semiconductor material when subjected to mechanical stresses. A piezoresistive sensor operates based on a diaphragm structure which deflects in response to applied pressure. However, the diaphragm structure will also deform from other stressors: for instance, it may deform from thermal stresses associated with stacks of different materials that have varying coefficients of thermal expansion. Alternatively, the diaphragm structure may deflect from stresses associated with mechanical mounting used to secure the diaphragm on a larger package.

Stress isolation in piezoresistive sensors is crucial to both function and longevity. Accuracy of a sensor, particularly in high temperature environments, is much improved when temperature stress is reduced. In the prior art, stress isolation has been addressed through traditional stress isolation stacks with glass pedestals, or inline stress isolation stacks as described in U.S. Pat. No. 9,010,190. Both methods found in prior art sensors utilize larger areas to accomplish stress isolation, give low yielded signals, and are costly.

SUMMARY

A sensor device includes a backing wafer, a diaphragm wafer connected to the backing wafer, a passivation layer on the diaphragm wafer opposite the backing wafer, and a topping wafer connected to the passivation layer opposite the backing wafer. The backing wafer includes a backing support portion and a central backing plate connected to the backing support portion by one or more back springs. The diaphragm wafer includes a diaphragm support portion and a sensing portion connected to the support portion by one or more diaphragm springs.

A method of making a sensor device includes processing a topping wafer, making a backing wafer with spring flexures, creating a diaphragm wafer with spring flexures, processing a base wafer, and assembling a wafer stack with the topping wafer, the backing wafer, the diaphragm wafer, and the base wafer. Creating the diaphragm wafer includes depositing a first passivation layer onto a silicon wafer, adding a piezoresistive layer on the first passivation layer, depositing a metal thin film on the first passivation layer, depositing a top passivation layer on the metal thin film, etching a diaphragm into the silicon wafer opposite the piezoresistive layer, etching spring reliefs into the silicon wafer surrounding the diaphragm, and etching fine features of the springs.

DETAILED DESCRIPTION

Stress isolation is critical for high performance piezoresistive sensors. The proposed MEMS device incorporates spring flexures. This provides a compact size sensor and an opportunity to increase the number of dies per wafer to reduce cost. Nonetheless, this design allows for sufficient stress isolation compared to the prior art.

Figure 1:
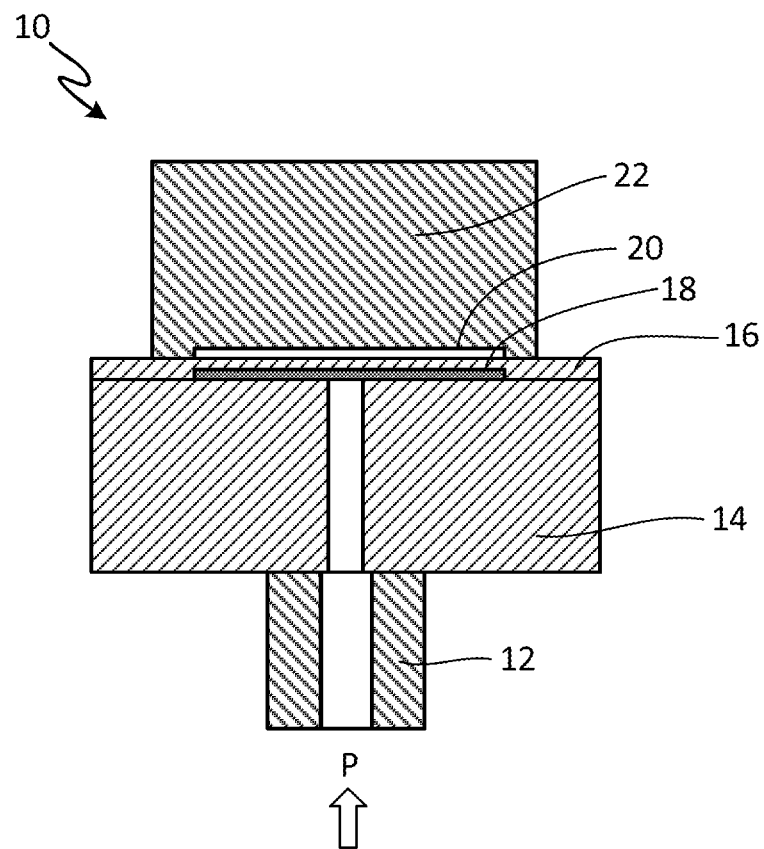
FIG. 1 is a schematic drawing of a MEMS device found in prior art.

FIG. 1 is a schematic drawing of MEMS device 10 found in prior art. MEMS device 10 includes pedestal 12, backing wafer 14, diaphragm wafer 16 (which includes diaphragm 18 and sensor 20), and topping wafer 22. In MEMS device 10, pressure from an external environment comes in the device in the direction of arrow P, and travels through pedestal 12 and backing wafer 14 to diaphragm 18 on diaphragm wafer 16.

Pedestal 12 is typically made of glass or Pyrex, and its purpose is to "thicken" the stack of the MEMS device. The introduction of pedestal 12 creates more space between diaphragm wafer 16 and a package (not pictured) on which MEMS device 10 is mounted. The extended length provides a longer distance for packaging stresses to dissipate before reaching the diaphragm. Pedestal 12 is mounted on a package with a eutectic bond. Opposite the package, pedestal 12 is bonded to backing wafer 14 (typically silicon) with an anodic bond.

Backing wafer 14 is bonded to diaphragm wafer 16 with frit, and diaphragm wafer 16 is bonded to topping wafer 22 with frit. All three wafers 14, 16, 22 are typically made of silicon. Backing wafer 14 and topping wafer 22 provide structural support to diaphragm wafer 16, which contains diaphragm 18 that deflects in response to pressure. Opposite diaphragm 18, sensor 20 can be a Wheatstone bridge or other piezoresistive device which detects pressure deflection from diaphragm 18.

Though pedestal 12 does isolate some stressors on diaphragm 18, it requires a complex bonding process using different materials that are costly, and results in a very large MEMS device that can be unwieldy.

Figure 2:
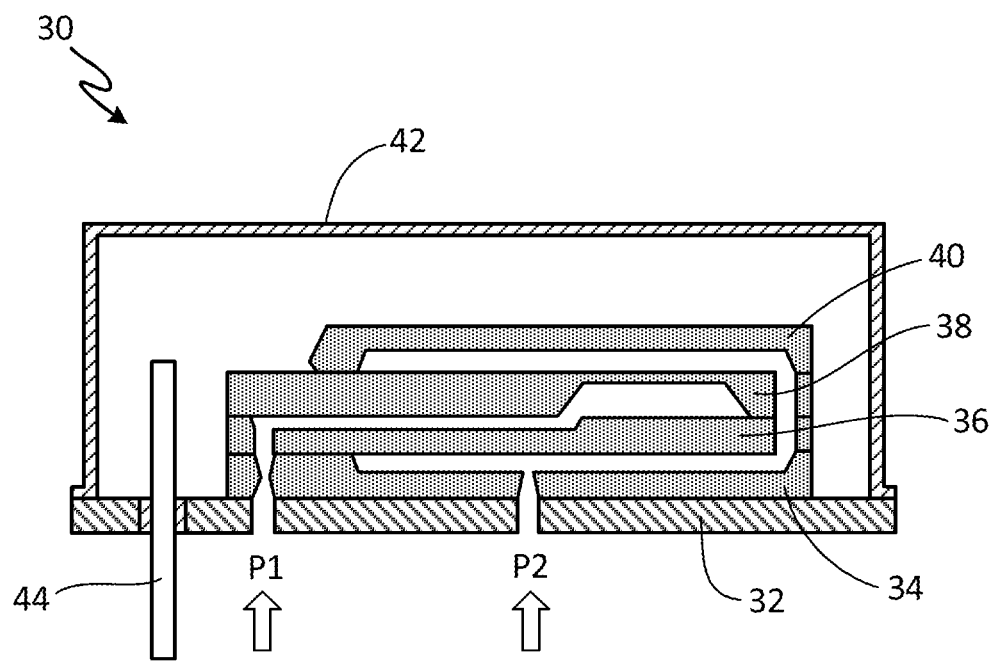
FIG. 2 is a schematic drawing of a second MEMS device found in prior art.

FIG. 2 is a schematic drawing of MEMS device 30 found in prior art showing an inline stress isolation stack. MEMS device 30 uses different stress isolation techniques than MEMS device 10 of FIG. 1. MEMS device 30 includes package base 32, base wafer 34, backing wafer 36, diaphragm wafer 38, topping wafer 40, housing 42, and electrical feedthrough pin 44.

Base wafer 34 is mounted on package base 32, and backing wafer 36 is mounted on base wafer 34. Diaphragm wafer 38 is attached to backing wafer 36 opposite base wafer 34, and topping wafer 40 is attached to diaphragm wafer 38 opposite backing wafer 36. Electrical feedthrough pin 44 is wire bonded to diaphragm wafer 38, and runs through package base 32. Housing 42 encloses wafers 34, 36, 38 and 40.

This version of a MEMS device uses in plane stress isolation. Instead of isolating MEMS device 30 via a pedestal, high aspect ratio features are incorporated into the plane of the silicon itself. This is achieved by turning the pedestal "on its side" and making it out of a silicon substrate. Effectively, this configuration has in-plane cantilever flexures. This configuration requires more space: the flexure is two wafers thick to accommodate pressure ports, and the flexure must be wide enough to allow for a frit seal and a minimum pressure port width. Moreover, this configuration does not allow for complex shapes, and must be long enough to create sufficient stressor isolation. The MEMS device of FIG. 2, as found in prior art, is costly and takes up significant space.

Figure 3A:
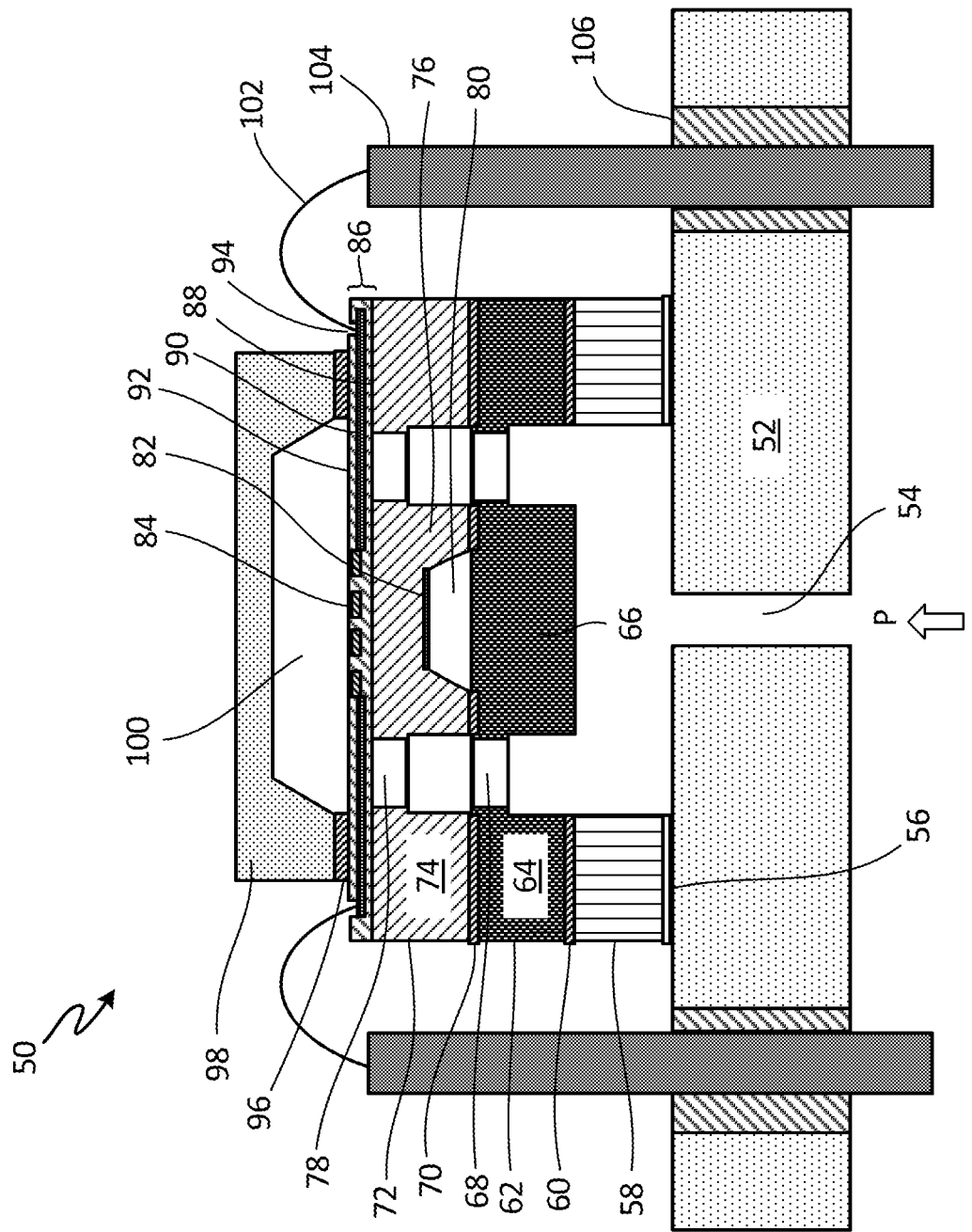
FIG. 3A is a schematic view of a MEMS device with stress isolation via spring flexures.
Figure 3B:
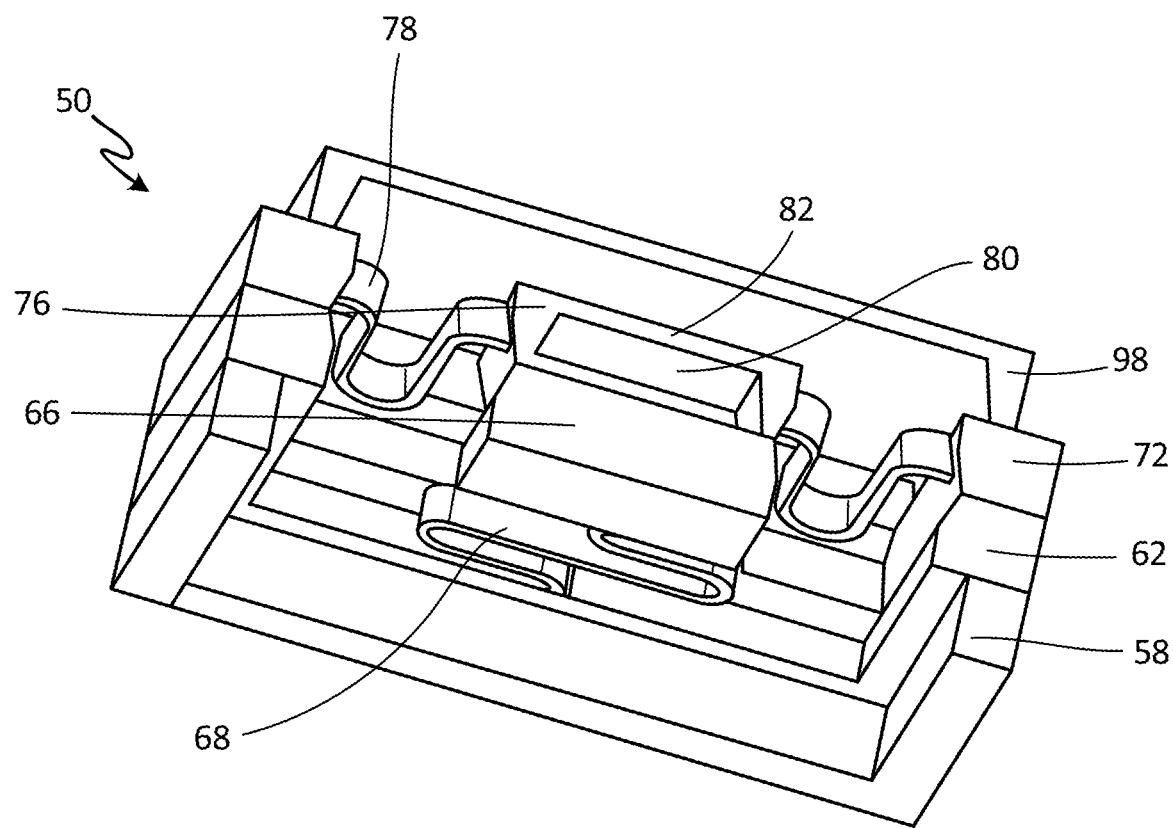
FIG. 3B is a cut-away perspective view of the MEMS device of FIG. 3A.
Figure 3C:
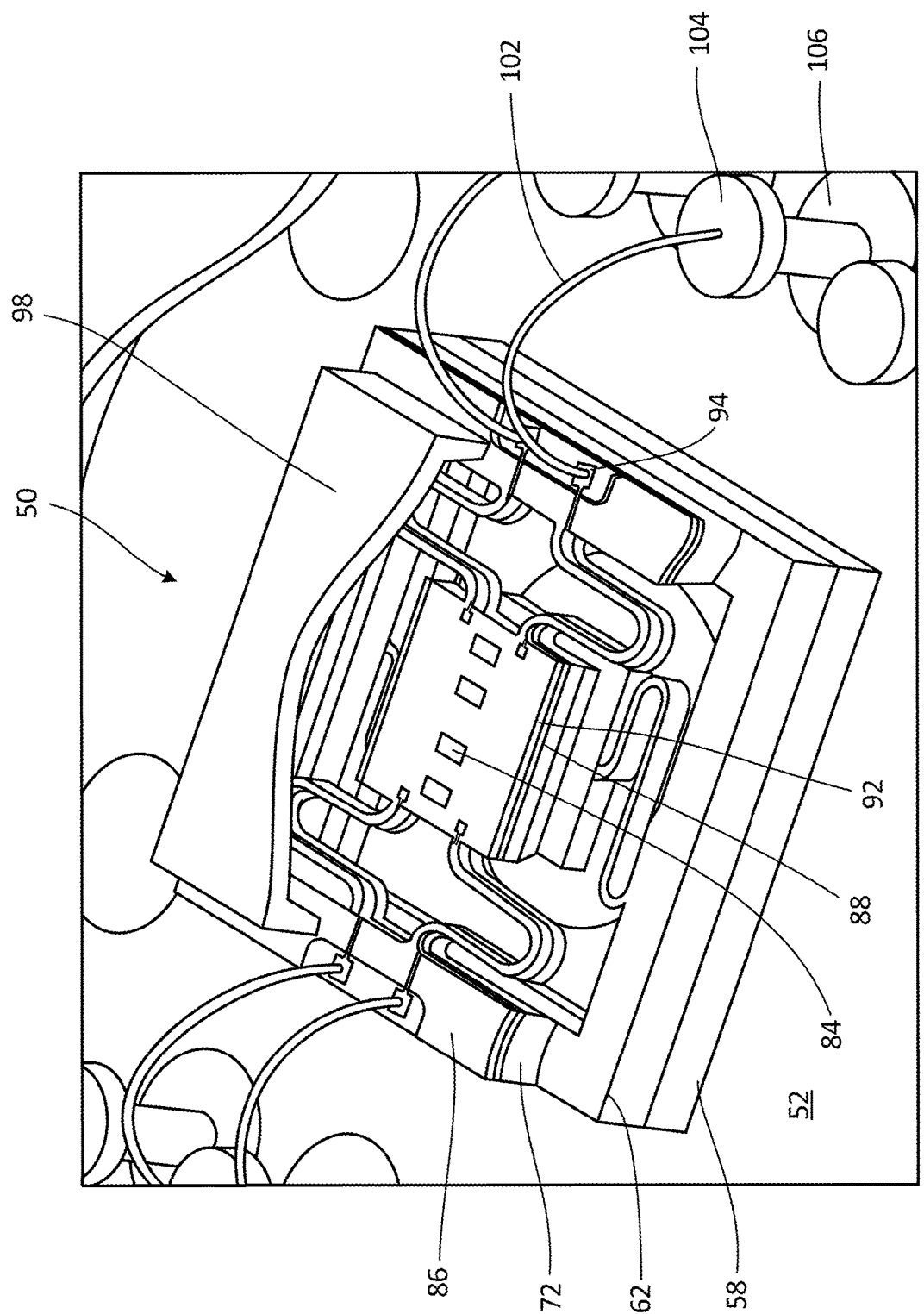
FIG. 3C is a perspective view of the MEMS device of FIGS. 3A & 3B.
Figure 3D:
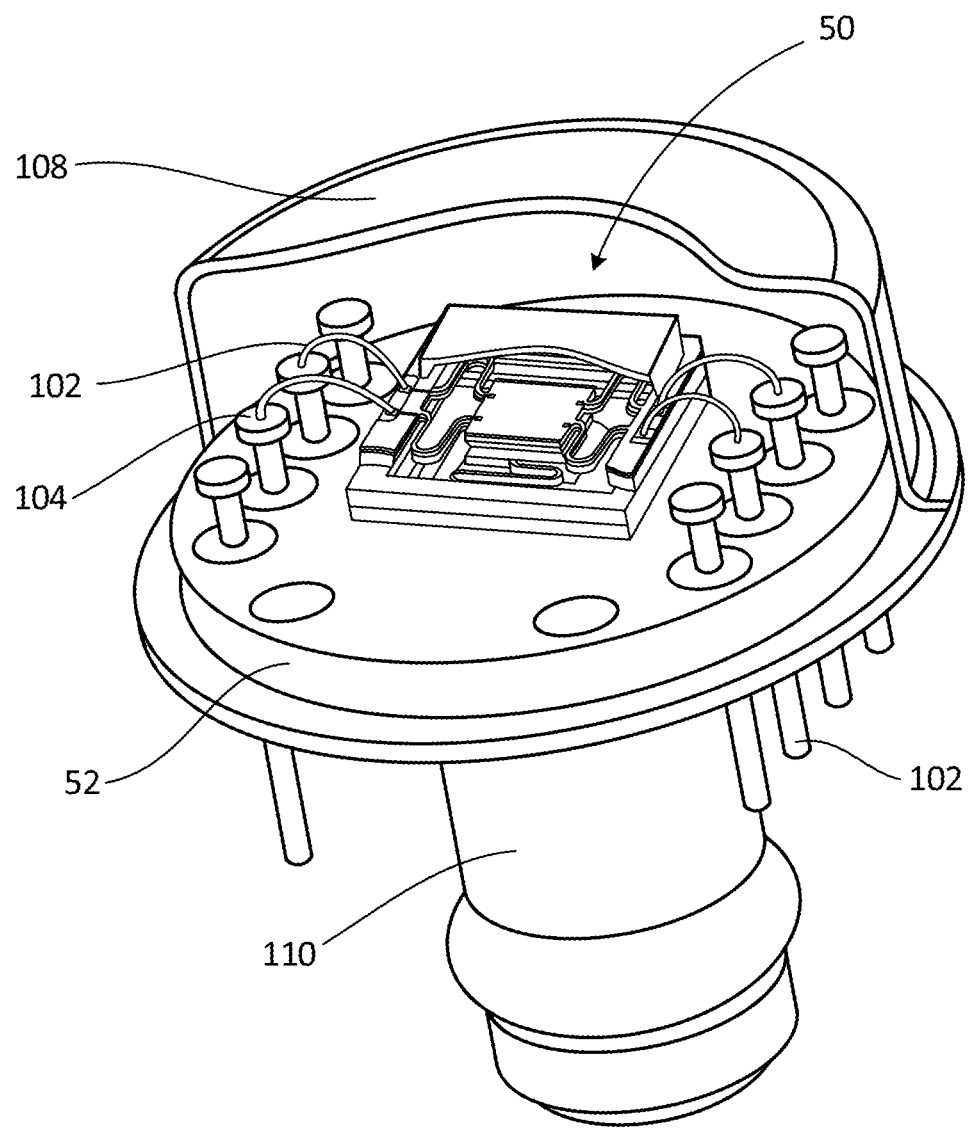
FIG. 3D is a perspective view of the MEMS device of FIGS. 3A-3C.

FIGS. 3A-3D show MEMS device 50. MEMS device 50 is a MEMS device with spring flexures. FIGS. 3A-3D will be discussed together. MEMS device 50 includes package base 52, base wafer 58, backing wafer 62, diaphragm wafer 72, passivation layer 86, topping wafer 98, and electrical feedthrough pins 104. FIG. 3A is a schematic cross-sectional view of MEMS device 50. FIG. 3B is a cut-away perspective view of MEMS device 50 with stress isolation via spring flexures. FIGS. 3C-3D are perspective views of a MEMS device attached to a sensor base.

MEMS device 50 is mounted on package base 52 through solder preforms 56. Package base 52 can be stainless steel, ceramic, plastic, or other appropriate material. Pressure port 54 is an opening that allows for an external fluid to exert pressure on MEMS device 50. Solder joints 56 connect package base 52 to base wafer 58. Base wafer 58 is typically silicon, and provides structural support for MEMS device 50 and diaphragm wafer 72. Alternatively, base wafer 58 may be an extension of package base 52. Thus, in some embodiments, backing wafer 62 is directly attached to package base 52 without base wafer 58.

Backing wafer 62 is attached to base wafer 58 opposite packages base 52 by frit 60. Backing wafer 62 can for example be formed of silicon, and includes both backing support portion 64 and central back plate 66. Central back plate 66 is held in the center of support portion 64 by backing springs 68, which are spring flexures that help with stress isolation in MEMS device 50. Backing springs 68 can be small, and do not need to be the same flexures used to isolate stresses on the diaphragm wafer. There are minimal restraints on spring flexure widths, and they can be folded, serpentine, or formed into other flexible shapes.

Diaphragm wafer 72 is attached to backing wafer 62 opposite base wafer 58 with frit 70. Diaphragm wafer 72 includes diaphragm support portion 74 and sensing portion 76. Sensing portion 76 is central in diaphragm wafer 72, with support portion 74 surrounding sensing portion 76. Sensing portion 76 is attached to central back plate 66 of backing wafer 62 by frit, and encloses reference vacuum 80. Diaphragm 82 is located on sensing portion 76 of diaphragm wafer 72. Diaphragm 82 deflects with incoming pressure P. A Wheatstone bridge or other piezoresistive device 84 is opposite diaphragm 82 to detect pressure changes.

In order to measure pressure, MEMS device 50's diaphragm 82 needs to encapsulate a reference pressure (typically a vacuum). Diaphragm 82 deflects depending on differential pressure between two sides of the diaphragm, which creates an imbalance and change in resistance detected by a piezoresistive device, such as a Wheatstone bridge. Thus, reference vacuum 80 is encapsulated.

Sensing portion 76 of diaphragm wafer 72 is connected to diaphragm support portion 74 by diaphragm springs 78. Springs 78 are spring flexures which isolate diaphragm 82 and diaphragm sensing portion 76 from external stressors. Similar to backing springs 68, diaphragm springs 78 can have a small flexure thickness, as they do not need to be connected between diaphragm wafer 72 and backing wafer 62. Additionally, there are minimal constraints on diaphragm springs 78 width, as they only need to be wide enough to carry an electrical trace to transmit a signal from diaphragm 82. Diaphragm springs 78 do not have constraints in shape or length; they can be folded, serpentine, straight, or curved, and long lengths may be folded into compact areas. This creates a high aspect ratio for the flexures, and significantly isolates diaphragm 82 from stressors.

Diaphragm springs 78 serve two purposes. First, they provide suspension of diaphragm wafer 72. Thus, stress due to the process of attaching MEMS device 50 to different materials is dissipated through diaphragm springs 78 instead of diaphragm 82. Second, diaphragm springs 78 can provide electrical connection between diaphragm wafer 72 and electrical feedthrough pins 104. Thin film metal traces deposited on diaphragm springs 78 can provide electrical communication between diaphragm wafer 72 to fixed wire-bond pads 94 (pictured in FIG. 3C) on diaphragm support portion 74. This electrical signal can then be sent through wire bonds 102 to electrical feedthrough pins 104 and out of MEMS device 50 for other use. Electrical feedthrough pins 104 run through package base 52 to an external environment, and are hermetically sealed by seal 106.

Diaphragm wafer 72 is topped by passivation layer 86. Passivation layer 86 includes first insulation layer 88, metal thin film 90, piezoresistive device 84, and second insulation layer 92. First insulation layer 88 is deposited on top of diaphragm wafer 72, and is typically silicon dioxide. Metal thin film 90 and piezoresistive device 84 are deposited on top of first insulation layer 88. Second insulation layer 92 is deposited on top of metal thin film 90. Holes are made in second insulation layer 92 to allow access to bond pads 94 in thin metal film 90, which is connected to piezoresistive device 84 through electrical traces on diaphragm springs 78.

Topping wafer 98 is attached to diaphragm wafer 72 opposite backing wafer 62 with frit 96. Topping wafer 98 is typically made of silicon, and includes topping wafer cavity 100. Topping wafer 98 protects diaphragm wafer 72, including diaphragm 82 and piezoresistive device 84, in addition to protecting bond pads 94 and wire bonds 102 from an external environment. Before use, MEMS device 50 is encapsulated by housing 108 (pictured in FIG. 3D) and is mounted on package base 52 and on sensor base 110.

MEMS device 50 is made by first individually processing the topping, backing, diaphragm and base wafers, and then assembling them together. Topping wafer 98 is made by etching a cavity into a silicon wafer, for example with a potassium hydroxide wet etch. Backing wafer 62 is made by etching spring reliefs into a silicon wafer with an anisotropic dry etch, including spring fine features. Base wafer 58 is made by etching a hole in a silicon wafer to create a frame. Alternatively, base wafer 58 can be etched out of the same material as package base 52. Each of these wafers is then screen printed to create frit bonds.

Diaphragm wafer 72 requires more steps to create. First, the passivation layer is deposited on a silicon wafer. The first insulation layer is deposited, then a piezoresistive layer (such as a Wheatstone bridge) is deposited and patterned. Next, the thin metal film is patterned and deposited, followed by the second insulation layer. Openings in the second insulation layer are then created for later electrical connections. This is followed by etching the diaphragm on a side of the silicon wafer opposite the insulation layer. This may be accomplished by potassium hydroxide wet etch. Next, the spring reliefs and spring fine features are etched.

After the wafers are prepared, they are stacked together. The backing wafer is frit bonded to the base wafer, the diaphragm wafer is frit bonded to the backing wafer, and the topping wafer is frit bonded to the diaphragm wafer. The base wafer is then metalized and attached to a package base. Subsequently, wire bonds can be attached to pins, and an outer housing can be attached.

The proposed MEMS device achieves stress isolation with a smaller area and lower cost than other methods. This MEMS device is comparable to previous MEMS process flows, by requires a smaller number of wafers. This method also eliminates the low yield, expensive glass pedestal process.

Discussion of Possible Embodiments

The following are non-exclusive descriptions of possible embodiments of the present invention.

A sensor device includes a backing wafer, a diaphragm wafer connected to the backing wafer, a passivation layer on the diaphragm wafer opposite the backing wafer, and a topping wafer connected to the passivation layer opposite the backing wafer. The backing wafer includes a backing support portion and a central backing plate connected to the backing support portion by one or more back springs. The diaphragm wafer includes a diaphragm support portion and a sensing portion connected to the support portion by one or more diaphragm springs.

The sensor of the preceding paragraph can optionally include, additionally and/or alternatively, any one or more of the following features, configurations and/or additional components:

The sensor device includes a base wafer connected to the backing wafer opposite the diaphragm wafer.

The base wafer is secured to a package base opposite the backing wafer.

The diaphragm springs are connected to the support portion of the diaphragm wafer.

The sensing portion of the diaphragm wafer contains a diaphragm.

The diaphragm wafer is attached to the backing wafer such that a reference pressure cavity is enclosed between the diaphragm wafer and the backing wafer.

A Wheatstone bridge is on the diaphragm wafer opposite the diaphragm.

The passivation layer includes a first insulation layer attached to the diaphragm wafer, a metal film attached to the first insulation layer opposite the diaphragm wafer, a piezoresistive layer, and a second insulation layer attached to the metal film and the piezoresistive layer opposite the first insulation layer.

The passivation layer includes an opening in the second such that an electrical connection can be made to the thin metal film.

The sensor device includes one or more wire bonds connected to the thin metal film through the opening, the wire bonds connected to one or more electrical feedthrough pins.

The one or more electrical feedthrough pins are sealed by a hermetic seal and run through a package base.

The backing wafer and the diaphragm wafer are connected with frit, and wherein the diaphragm wafer and the topping wafer are connected with frit.

A method of making a sensor device includes processing a topping wafer, making a backing wafer with spring flexures, creating a diaphragm wafer with spring flexures, creating the diaphragm wafer, processing a base wafer, and assembling a wafer stack with the topping wafer, the backing wafer, the diaphragm wafer, and the base wafer. Creating the diaphragm wafer includes depositing a first passivation layer onto a silicon wafer, adding a piezoresistive layer on the first passivation layer, depositing a metal thin film on the first passivation layer, depositing a top passivation layer on the metal thin film, etching a diaphragm into the silicon wafer opposite the piezoresistive layer, etching spring reliefs into the silicon wafer surrounding the diaphragm, and etching fine features of the springs.

The method of the preceding paragraph can optionally include, additionally and/or alternatively, any one or more of the following features, configurations and/or additional components:

Assembling a wafer stack includes bonding the wafers together, metalizing the base wafer, soldering the base wafer to a package, wire bonding electrical feedthrough pins to the diaphragm wafer, and attaching a cap header.

Bonding the wafers together includes bonding the backing wafer to the base wafer, bonding the diaphragm wafer to the backing wafer opposite the base wafer, and bonding the topping wafer to the second passivation layer on the diaphragm wafer opposite the backing wafer.

Processing a topping wafer comprises etching a cavity into a silicon wafer and screen printing frit on to the silicon wafer.

Making a backing wafer comprises etching spring reliefs into a silicon wafer, etching spring fine features into the silicon wafer, and screen printing frit on to the silicon wafer.

The first passivation layer comprises silicon dioxide.

The second passivation layer comprises silicon nitride.

Processing a base wafer comprises etching a hole in a silicon wafer and screen printing frit on the silicon wafer.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A method of making a sensor device comprises:
processing a topping wafer;
making a backing wafer comprising:
  a backing support portion, and
  a central backing plate connected to the backing support portion by one or more backing springs;
creating a diaphragm wafer comprising:
  a diaphragm support portion, and
  a sensing portion connected to the diaphragm support portion by one or more diaphragm springs, wherein creating the diaphragm wafer comprises:
    depositing a first passivation layer onto a silicon wafer, adding a piezoresistive layer on the first passivation layer,
depositing a metal film on the first passivation layer,
depositing a top passivation layer on the metal film,
etching a diaphragm into the silicon wafer opposite the piezoresistive layer,
etching spring reliefs into the silicon wafer surrounding the diaphragm, and
etching fine features of the diaphragm springs;
processing a base wafer; and
assembling a wafer stack with the topping wafer, the backing wafer, the diaphragm wafer, and the base wafer, such that the backing wafer and the diaphragm wafer are connected with frit, and the diaphragm wafer and the topping wafer are connected with frit.

2. The method of claim 1, wherein assembling a wafer stack comprises:
bonding the wafers together;
metalizing the base wafer;
soldering the base wafer to a package;
wire bonding electrical feedthrough pins to the diaphragm wafer; and
attaching a cap header.

3. The method of claim 2, wherein bonding the wafers together comprises:
bonding the backing wafer to the base wafer;
bonding the diaphragm wafer to the backing wafer opposite the base wafer; and
bonding the topping wafer to the second passivation layer on the diaphragm wafer opposite the backing wafer.

4. The method of claim 1, wherein processing a topping wafer comprises etching a cavity into a silicon wafer and screen printing frit on to the silicon wafer.

5. The method of claim 1, wherein making a backing wafer comprises etching spring reliefs into a silicon wafer, etching spring fine features into the silicon wafer, and screen printing frit on to the silicon wafer.

6. The method of claim 1, wherein the first passivation layer comprises silicon dioxide.

7. The method of claim 1, wherein the second passivation layer comprises silicon nitride.

8. The method of claim 1, wherein processing a base wafer comprises etching a hole in a silicon wafer and screen printing frit on the silicon wafer.

* * * * *